(12) United States Patent
Yang (10) Patent No.: US 9,370,919 B2
(45) Date of Patent: Jun. 21, 2016

(54) VACUUM SUCTION ADJUSTABLE TRANSFER ROLLER AND FILM ATTACHMENT METHOD USING THE TRANSFER ROLLER

(71) Applicant: Shenzhen China Star Optoelectronics Technology Co., Ltd., Shenzhen, Guangdong (CN)

(72) Inventor: Shun Yang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 283 days.

(21) Appl. No.: 14/347,598

(22) PCT Filed: Oct. 18, 2013

(86) PCT No.: PCT/CN2013/085513
§ 371 (c)(1),
(2) Date: Mar. 26, 2014

(87) PCT Pub. No.: WO2015/054908
PCT Pub. Date: Apr. 23, 2014

(65) Prior Publication Data
US 2015/0298444 A1    Oct. 22, 2015

(30) Foreign Application Priority Data
Oct. 15, 2013  (CN) .......................... 2013 1 0482103

(51) Int. Cl.
*B32B 37/02*         (2006.01)
*B32B 37/00*         (2006.01)
(Continued)

(52) U.S. Cl.
CPC .............. *B32B 37/025* (2013.01); *B23Q 3/088* (2013.01); *B32B 37/18* (2013.01);
(Continued)

(58) Field of Classification Search
CPC ... F16K 31/004; F16K 31/005; F16K 31/006; F16K 31/007; F16K 31/008; F16K 99/0046; B32B 37/025; B32B 37/1036; B32B 37/1054; B32B 2457/202; B32B 37/18; B32B 37/182; B32B 37/185; B32B 38/1858
See application file for complete search history.

(56) References Cited

U.S. PATENT DOCUMENTS 5,634,636 A * 6/1997 Jackson ................. B65H 5/228
271/184
5,752,577 A * 5/1998 Urakami ................ B62D 57/00
180/164

(Continued)

FOREIGN PATENT DOCUMENTS

CN    1118048 A    3/1996
CN    1437044 A    8/2003

(Continued)

*Primary Examiner* — Jason L Vaughan
(74) *Attorney, Agent, or Firm* — Andrew C. Cheng (57) ABSTRACT

The present invention provides a vacuum suction adjustable transfer roller and a film attachment method using the transfer roller. The transfer roller includes: a roller body (20) and a plurality of adjustment devices (40) mounted in the roller body (20). The roller body (20) includes a plurality of air draw-in passages (22) uniformly distributed therein. The air draw-in passages (22) draw in air by means of an air evacuation device. Each of the adjustment devices (40) includes: a valve (42) arranged in each of the air draw-in passages (22), a piezoelectric ceramic piece (44) connected to the valve (42), and a control circuit (46) electrically connected to the piezoelectric ceramic piece (44). The control circuit (46) controls the intensity of an electric field applied to the piezoelectric ceramic piece (44) so that the piezoelectric ceramic piece (44) undergoes deformation under the action of the electric field and the valve (42) is caused by the deformation of the piezoelectric ceramic piece (44) to selectively insert into or withdraw out of the air draw-in passages (22) so as to control flow of air drawn in by the air draw-in passages (22) and thus controlling the magnitude of a vacuum suction force induced by the air draw-in passages (22).

10 Claims, 5 Drawing Sheets

(51) Int. Cl.
*B32B 38/18* (2006.01)
*B65H 27/00* (2006.01)
*B23Q 3/08* (2006.01)
*B32B 37/18* (2006.01)
*B65H 3/10* (2006.01)
*F16K 31/00* (2006.01)
*G02F 1/13* (2006.01)

(52) U.S. Cl.
CPC .............. *B32B 38/1858* (2013.01); *B65H 3/10* (2013.01); *B65H 27/00* (2013.01); *F16K 31/005* (2013.01); *B32B 2457/202* (2013.01); *G02F 1/1303* (2013.01)

(56) References Cited

U.S. PATENT DOCUMENTS

| | | | |
|---|---|---|---|
| 5,833,209 A * | 11/1998 | Steinruck | F01L 9/02 251/47 |
| 6,032,923 A * | 3/2000 | Biegelsen | B65H 5/228 137/599.07 |
| 6,038,976 A * | 3/2000 | Helmstadter | B41F 21/102 101/174 |
| 6,123,316 A * | 9/2000 | Biegelsen | B32B 3/10 251/129.01 |
| 6,676,106 B2 * | 1/2004 | Swartz | B32B 27/08 216/2 |
| 7,022,204 B2 * | 4/2006 | Kanbara | B32B 37/182 156/235 |
| 7,234,395 B2 * | 6/2007 | Forch | B41F 21/102 101/232 |
| 8,887,781 B2 * | 11/2014 | Kodera | B29C 63/024 156/215 |
| 2001/0035509 A1 * | 11/2001 | Chase | B65H 5/228 251/129.01 |

FOREIGN PATENT DOCUMENTS

| | | |
|---|---|---|
| CN | 101795950 A | 8/2010 |
| CN | 101958281 A | 1/2011 |
| CN | 102661424 A | 9/2012 |
| CN | 202608200 U | 12/2012 |
| CN | 103014637 A | 4/2013 |
| JP | 2001042315 A | 2/2001 |
| JP | 2002014359 A | 1/2002 |

* cited by examiner

Fig. 8

VACUUM SUCTION ADJUSTABLE TRANSFER ROLLER AND FILM ATTACHMENT METHOD USING THE TRANSFER ROLLER

BACKGROUND OF THE INVENTION

1. Field of the Invention

The present invention relates to a vacuum suction adjustable transfer roller, and in particular to a vacuum suction adjustable transfer roller and a film attachment method using the transfer roller.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal display panel.

The two substrates that constitute the conventional liquid crystal display panel are both provided with various optic films attached thereto, such as polarization films and brightness enhancement films, in order to enhance the effect of displaying.

The optic film attachment methods that have been heretofore used are performed through press-to-attach to a substrate by means of a transfer roller. A displaying panel that enables 3D displaying by attaching a 3D film to a substrate is being widely used, in which the attachment of the 3D film is also achieved by using a transfer roller to press and attach the 3D film to the substrate. Specifically, the transfer roller uses a special adhesive layer having adhesion to hold the 3D film thereon and then, presses and attaches the 3D film to the substrate. However, the special adhesive layer having adhesion has a predetermined lifespan and must be periodically replaced. Further, the adhesion of the special adhesive layer is generally impossible to control. Consequently, to ensure the 3D film can be effectively pressed and attached to the substrate, the pressure that the transfer roller applies to the substrate must be set as a pressure that ensures achievement of the attachment of the 3D film for the situation that the special adhesive layer having adhesion shows the maximum of the adhesion. This, however, may pose an increased pressure applied to the substrate. Such a pressure may cause a potential risk of breaking the substrate when the substrate is relatively thin (especially when the thickness of the substrate is less than or equal to 0.5 mm).

SUMMARY OF THE INVENTION

An object of the present invention is to provide a vacuum suction adjustable transfer roller, which enables precise control of the vacuum suction force of the transfer roller and has a simple structure and a low cost.

Another object of the present invention is to provide a film attaching method, which adaptively adjusts the magnitude of a suction force that a transfer roller applies to a thin film according to a pressure bearing capability of a film-to-attach substrate so as to ensure the substrate is not broken while effective attachment is being performed and which has a simple operation and can effectively improve the yield rate of attachment.

To achieve the above objects, the present invention provides a vacuum suction adjustable transfer roller, which comprises: a roller body and a plurality of adjustment devices mounted to the roller body. The roller body comprises a plurality of air draw-in passages uniformly distributed therein. The air draw-in passages draw in air by means of an air evacuation device. Each of the adjustment devices comprises: a valve arranged in each of the air draw-in passages, a piezoelectric ceramic piece connected to the valve, and a control circuit electrically connected to the piezoelectric ceramic piece. The control circuit controls an intensity of an electric field applied to the piezoelectric ceramic piece so that the piezoelectric ceramic piece undergoes deformation under the action of the electric field and the valve is caused by the deformation of the piezoelectric ceramic piece to selectively insert into or withdraw out of the air draw-in passage so as to control flow of air drawn in by the air draw-in passage and thus controlling a magnitude of a vacuum suction force induced by the air draw-in passage.

The plurality of air draw-in passages is in communication with each other and the air evacuation device comprises a vacuum pump.

The roller body comprises an insertion slot corresponding to each of the air draw-in passages and the valve selectively insertable into and removable out of the air draw-in passage through the insertion slot to selectively close and open the air draw-in passage.

The roller body comprises a mounting section corresponding to each of the air draw-in passages and the piezoelectric ceramic piece has two end mounted to the mounting section. The valve has an end fixedly mounted to a middle of the piezoelectric ceramic piece and an opposite end inserted into the air draw-in passage.

The present invention also provides a vacuum suction adjustable transfer roller, which comprises: a roller body and a plurality of adjustment devices mounted to the roller body, the roller body comprising a plurality of air draw-in passages uniformly distributed therein, the air draw-in passages drawing in air by means of an air evacuation device, each of the adjustment devices comprising: a valve arranged in each of the air draw-in passages, a piezoelectric ceramic piece connected to the valve, and a control circuit electrically connected to the piezoelectric ceramic piece, the control circuit controlling an intensity of an electric field applied to the piezoelectric ceramic piece so that the piezoelectric ceramic piece undergoes deformation under the action of the electric field and the valve is caused by the deformation of the piezoelectric ceramic piece to selectively insert into or withdraw out of the air draw-in passage so as to control flow of air drawn in by the air draw-in passage and thus controlling a magnitude of a vacuum suction force induced by the air draw-in passage;

wherein the roller body comprises an insertion slot corresponding to each of the air draw-in passages and the valve selectively insertable into and removable out of the air draw-in passage through the insertion slot to selectively close and open the air draw-in passage; and wherein the roller body comprises a mounting section corresponding to each of the air draw-in passages and the piezoelectric ceramic piece has two end mounted to the mounting section, the valve having an end fixedly mounted to a middle of the piezoelectric ceramic piece and an opposite end inserted into the air draw-in passage.

The plurality of air draw-in passages is in communication with each other and the air evacuation device comprises a vacuum pump.

The present invention further provides a film attachment method, which comprises the following steps:

(1) holding a film-to-be-attached on a transfer roller by means of vacuum;

(2) adjusting vacuum suction that the transfer roller applies to the film-to-be-attached according to a pressure bearing capacity of the film-to-attach substrate and material of the film-to-be-attached; and (3) attaching the film-to-be-attached to the film-to-attach substrate at a corresponding position.

The transfer roller comprises a roller body and a plurality of adjustment devices mounted to the roller body. The roller body comprises a plurality of air draw-in passages uniformly distributed therein. The air draw-in passages draw in air by means of an air evacuation device. Each of the adjustment devices comprises: a valve arranged in each of the air draw-in passages, a piezoelectric ceramic piece connected to the valve, and a control circuit electrically connected to the piezoelectric ceramic piece. The film-to-be-attached is held on the roller body of the transfer roller by means of vacuum. The roller body comprises an insertion slot corresponding to each of the air draw-in passages and the valve selectively insertable into and removable out of the air draw-in passage through the insertion slot to selectively close and open the air draw-in passage. The roller body comprises a mounting section corresponding to each of the air draw-in passages and the piezoelectric ceramic piece has two end mounted to the mounting section. The valve has an end fixedly mounted to a middle of the piezoelectric ceramic piece and an opposite end inserted into the air draw-in passage.

In step (2), the control circuit controls an intensity of an electric field applied to the piezoelectric ceramic piece so that the piezoelectric ceramic piece undergoes deformation under the action of the electric field and the valve is caused by the deformation of the piezoelectric ceramic piece to selectively insert into or withdraw out of the air draw-in passage so as to control flow of air drawn in by the air draw-in passage and thus controlling a magnitude of a vacuum suction force induced by the air draw-in passage.

The plurality of air draw-in passages is in communication with each other and the air evacuation device comprises a vacuum pump.

The film-to-be-attached is a 3D film and the film-to-attach substrate is a glass substrate.

The pressure bearing capacity of the film-to-attach substrate is determined according to thickness of the film-to-attach substrate.

The efficacy of the present invention is that the present invention provides a vacuum suction adjustable transfer roller and a film attachment method using the transfer roller, wherein piezoelectric ceramic based adjustment devices are provided in air draw-in passages of a roller body of a transfer roller has to accurately control the magnitudes of vacuum suction forces induced in the air draw-in passages so that when a film is attached, the suction force that the roller body applies to the film is adjusted according to the pressure bearing capacity of a substrate and the material of the film to prevent the substrate from breaking resulting from excessive pressure in attaching the film and thus effectively improving yield rate of attachment. The structure is simple and the operation is easy so that efficiency of attachment can be increased and the cost reduced.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIGS. 1-5, the present invention provides a vacuum suction adjustable transfer roller, which comprises: a roller body 20 and a plurality of adjustment devices 40 mounted to the roller body 20. The roller body 20 comprises a plurality of air draw-in passages 22 uniformly distributed therein. The adjustment devices 40 are mounted at locations corresponding to the air draw-in passages 22. The air draw-in passages 22 functions to draw in air by means of an air evacuation device. Each of the adjustment devices 40 comprises: a valve 42 arranged in the respective air draw-in passage 22, a piezoelectric ceramic piece 44 connected to the valve 42, and a control circuit 46 electrically connected to the piezoelectric ceramic piece 44. The roller body 20 comprises a mounting section 24 corresponding to each of the air draw-in passages 22. The piezoelectric ceramic piece 44 has two ends mounted to the mounting section 24. The valve 42 has an end fixedly mounted to a middle of the piezoelectric ceramic piece 44 and an opposite end inserted into the air draw-in passages 22.

The piezoelectric ceramic piece 44 is made of a ceramic material that converts mechanical energy and electrical energy between each other and is an inorganic non-metallic material. This is a material of piezoelectric effect. Piezoelectric effect is an effect that a medium, when acted upon by a force, undergoes deformation, which results in electricity on a surface of the medium. This is positive piezoelectric effect. Oppositely, through the application of an exciting electric field, the medium would undergo mechanical deformation. This is called inverse piezoelectric effect. Such a marvelous phenomenon has been used by scientists in various field closely related to human living to achieve the functions of energy conversion, transducing, driving, and frequency control.

The piezoelectric ceramic 44 has characteristics of sensitivity that converts minute mechanical vibrations into electrical signals and is used in sonar systems, weather surveys, remote-controlled environmental protection, and household electrical appliances. Earthquakes are destructive disasters and the seismic sources are started from depth of the earth crust, making them hard to detect and setting human being in an embarrassing and powerless position. The sensitivity of the piezoelectric ceramic enables detections of turbulence caused by wing flapping an insect tens of meters away so that using such a material to make a piezoelectric seismometer can accurately detect the magnitudes of earthquakes, indicate the directions and distances of the earthquakes.

Figure 1:
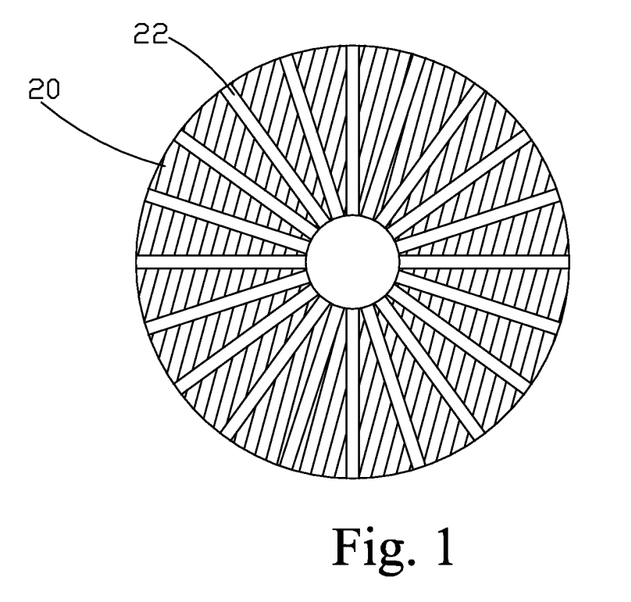
FIG. 1 is a cross-sectional view showing a vacuum suction adjustable transfer roller according to the present invention.
Figure 2:
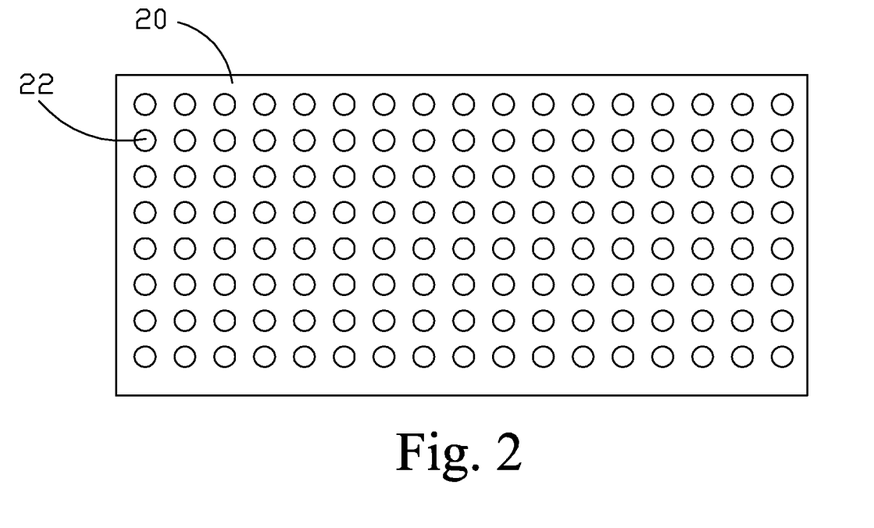
FIG. 2 is a developed view of a circumference surface of the vacuum suction adjustable transfer roller according to the present invention.
Figure 3:
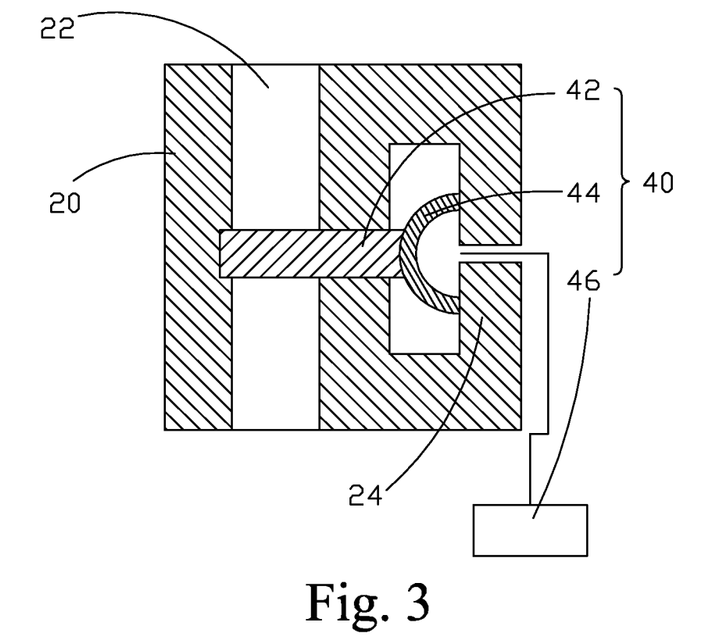
FIG. 3 is a schematic view showing a valve of an adjustment device of the vacuum suction adjustable transfer roller according to the present invention inserted into an air draw-in passage.
Figure 4:
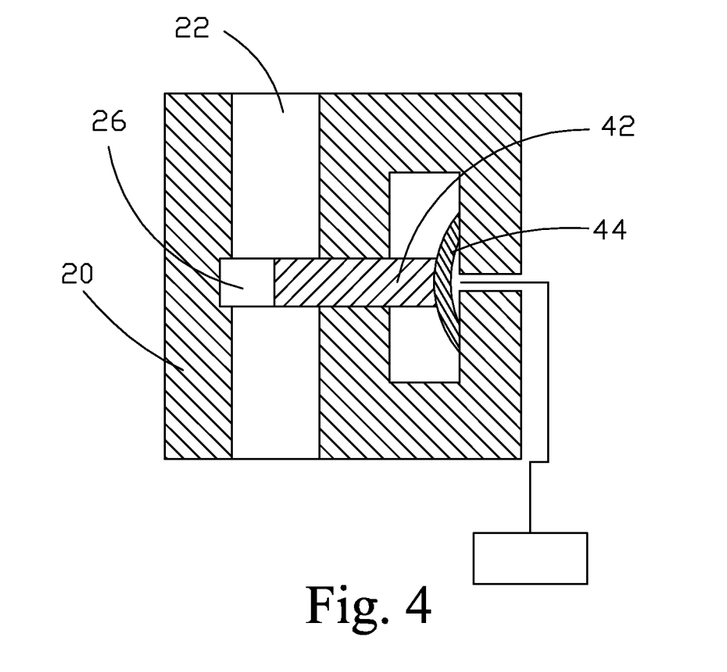
FIG. 4 is a schematic view showing a valve of an adjustment device of the vacuum suction adjustable transfer roller according to the present invention partially inserted into an air draw-in passage.

The piezoelectric ceramic 44 undergoes deformation under the action of an electric field. Based on such a principle, the piezoelectric ceramic piece 44 is commonly used in precise control mechanisms. Based on such characteristics of the piezoelectric ceramic piece 44, as shown in FIGS. 3 and 4, the present invention uses the control circuit 46 to control the intensity of an electric field applied to the piezoelectric ceramic piece 44 and the piezoelectric ceramic piece 44 generates deformation under the action of the electric field. With the deformation of the piezoelectric ceramic piece 44, the valve 42 takes an action of insertion into or withdrawal out of the respective air draw-in passage 22 so as to control the flow of drawn-in air through the air draw-in passage 22 and thus controlling the magnitude of the vacuum suction induced in the air draw-in passage 22.

Figure 5:
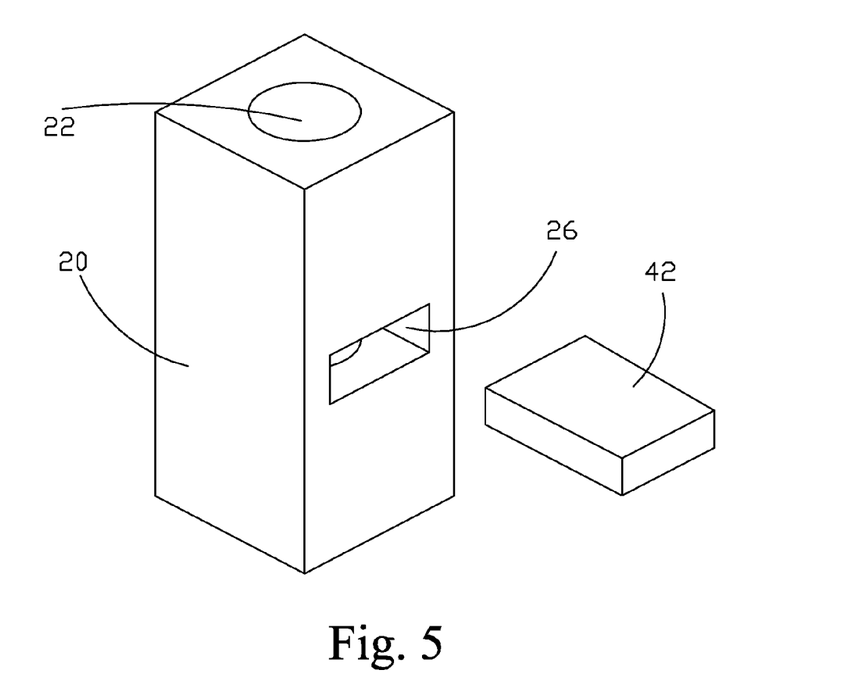
FIG. 5 is a schematic perspective view showing a portion of the vacuum suction adjustable transfer roller according to the present invention, illustrating the air draw-in passage and the valve.

Specifically, referring to FIGS. 3-5, the roller body 20 comprises an insertion slot 26 corresponding to each of the air draw-in passages 22. The valve 42 is inserted into or withdrawn out of the air draw-in passage 22 via the insertion slot 26 so as to close or open the air draw-in passage 22. When the electric field applied by the control circuit 46 to the piezoelectric ceramic piece 44 is at the maximum, the piezoelectric ceramic piece 44, under the action of the electric field, deforms and pushes the valve 42 to move forward so as to make the valve 42 insert, through the insertion slot 26, completely into the air draw-in passage 22 to close the air draw-in passage 22 so that the vacuum suction in the air draw-in passage 22 become null. When the electric field applied by the control circuit 46 to the piezoelectric ceramic piece 44 is large, the piezoelectric ceramic piece 44, under the action of the electric field, deforms and pushes the valve 42 to move forward so as to have the valve 42 insert, through the insertion slot 26, partially into the air draw-in passage 22 to partially close the air draw-in passage 22 and thus, the vacuum suction induced in the air draw-in passage 22 is small. When the electric field applied by the control circuit 46 to the piezoelectric ceramic piece 44 is at the minimum thereof, the piezoelectric ceramic piece 44, under the action of the electric field, deforms almost none and does not push the valve 42 to move forward so that the valve 42 is completely located outside the air draw-in passage 22, whereby the air draw-in passage 22 is completely open and the vacuum suction induced in the air draw-in passage 22 is maximum.

Further, the piezoelectric ceramic piece 44 has additional characteristics including high frequency stability, high accuracy, and wide application ranges. This allows the present invention to use the control circuit 46 to accurately control the deformation of the piezoelectric ceramic piece 44 so as to achieve high preciseness control of the suction force of the roller body 20.

Further, the piezoelectric ceramic piece 44 has a relatively small size, is not moisture-absorbable, and has an extended lifespan, making the adjustment devices 40 of the present invention small in size, easy in installation, less affected by moisture, and extended in lifespan.

In the instant embodiment, the plurality of air draw-in passages 22 is in communication with each other and may be subjected to air evacuation by means of an air evacuation device (not shown). The air evacuation device can be a vacuum pump. When the valves 42 close the air draw-in passages 22, the interiors of the air draw-in passages 22 are set in vacuum.

It is noted that the diameter of the roller body 20 of the transfer roller can be altered according to the film to be attached. The size of the roller body 20 does not pose any influence on the technical effectiveness of the present invention.

Figure 6:
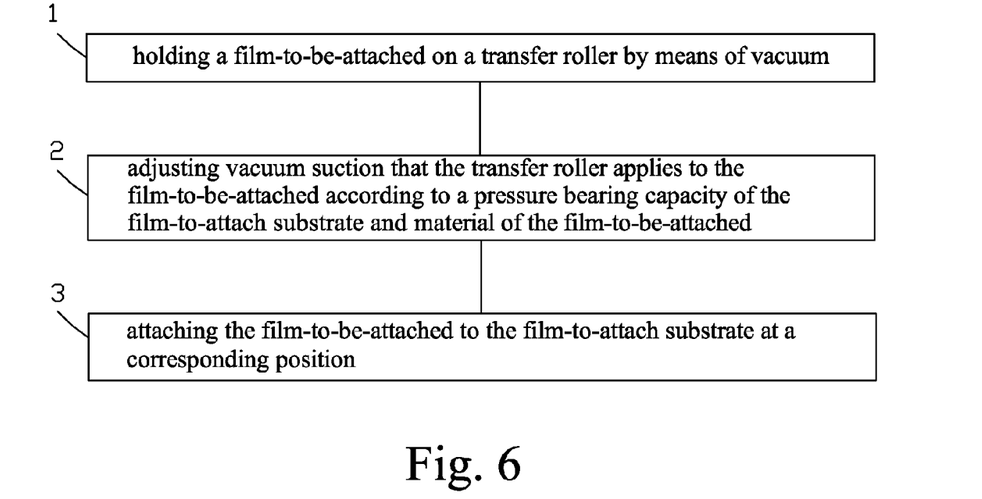
FIG. 6 is a flow chart illustrating a film attachment method according to the present invention.

Referring to FIG. 6, with additional reference to FIGS. 1-5, the present invention also provides a film attachment method, which comprises the following steps:

Step 1: Holding a Film-to-be-Attached 60 on a Transfer Roller by Means of Vacuum.

The transfer roller comprises a roller body 20 and a plurality of adjustment devices 40 mounted to the roller body 20. The roller body 20 comprises a plurality of air draw-in passages 22 uniformly distributed therein. The adjustment devices 40 are mounted at locations corresponding to the air draw-in passages 22. The air draw-in passages 22 functions to draw in air by means of an air evacuation device. Each of the adjustment devices 40 comprises: a valve 42 arranged in the respective air draw-in passage 22, a piezoelectric ceramic piece 44 connected to the valve 42, and a control circuit 46 electrically connected to the piezoelectric ceramic piece 44. The film-to-be-attached 60 is attached to the roller body 20 of the transfer roller by means of vacuum induced in the air draw-in passages 22. The roller body 20 comprises a mounting section 24 corresponding to each of the air draw-in passages 22. The piezoelectric ceramic piece 44 has two ends mounted to the mounting section 24. The valve 42 has an end fixedly mounted to a middle of the piezoelectric ceramic piece 44 and an opposite end inserted into the air draw-in passages 22.

In the instant embodiment, the plurality of air draw-in passages 22 is in communication with each other and may be subjected to air evacuation by means of an air evacuation device (not shown). The air evacuation device can be a vacuum pump. When the valves 42 close the air draw-in passages 22, the interiors of the air draw-in passages 22 are set in vacuum.

It is noted that the diameter of the roller body 20 of the transfer roller can be altered according to the film-to-be attached 60 that is to be held thereof. The size of the roller body 20 does not pose any influence on the technical effectiveness of the present invention.

The piezoelectric ceramic piece 44 is made of a ceramic material that converts mechanical energy and electrical energy between each other and is an inorganic non-metallic material. This is a material of piezoelectric effect. Piezoelectric effect is an effect that a medium, when acted upon by a force, undergoes deformation, which results in electricity on a surface of the medium. This is positive piezoelectric effect. Oppositely, through the application of an exciting electric field, the medium would undergo mechanical deformation. This is called inverse piezoelectric effect. Such a marvelous phenomenon has been used by scientists in various field closely related to human living to achieve the functions of energy conversion, transducing, driving, and frequency control.

The piezoelectric ceramic 44 has characteristics of sensitivity that converts minute mechanical vibrations into electrical signals and is used in sonar systems, weather surveys, remote-controlled environmental protection, and household electrical appliances. Earthquakes are destructive disasters and the seismic sources are started from depth of the earth crust, making them hard to detect and setting human being in an embarrassing and powerless position. The sensitivity of the piezoelectric ceramic enables detections of turbulence caused by wing flapping an insect tens of meters away so that using such a material to make a piezoelectric seismometer can accurately detect the magnitudes of earthquakes, indicate the directions and distances of the earthquakes.

Step 2: Adjusting Vacuum Suction that the Transfer Roller Applies to the Film-to-be-Attached 60 According to a Pressure Bearing Capacity of the Film-to-Attach Substrate 80 and Material of the Film-to-be-Attached 60.

The piezoelectric ceramic 44 undergoes deformation under the action of an electric field. Based on such a principle, the piezoelectric ceramic piece 44 is commonly used in precise control mechanisms. Based on such characteristics of the piezoelectric ceramic piece 44, as shown in FIGS. 3 and 4, the present invention uses the control circuit 46 to control the intensity of an electric field applied to the piezoelectric ceramic piece 44 and the piezoelectric ceramic piece 44 generates deformation under the action of the electric field. With the deformation of the piezoelectric ceramic piece 44, the valve 42 takes an action of insertion into or withdrawal out of the respective air draw-in passage 22 so as to control the flow of drawn-in air through the air draw-in passage 22 and thus controlling the magnitude of the vacuum suction induced in the air draw-in passage 22.

Specifically, referring to FIGS. 3-5, the roller body 20 comprises an insertion slot 26 corresponding to each of the air draw-in passages 22. The valve 42 is inserted into or withdrawn out of the air draw-in passage 22 via the insertion slot 26 so as to close or open the air draw-in passage 22. When the electric field applied by the control circuit 46 to the piezoelectric ceramic piece 44 is at the maximum, the piezoelectric ceramic piece 44, under the action of the electric field, deforms and pushes the valve 42 to move forward so as to make the valve 42 insert, through the insertion slot 26, completely into the air draw-in passage 22 to close the air draw-in passage 22 so that the vacuum suction in the air draw-in passage 22 become null. When the electric field applied by the control circuit 46 to the piezoelectric ceramic piece 44 is large, the piezoelectric ceramic piece 44, under the action of the electric field, deforms and pushes the valve 42 to move forward so as to have the valve 42 insert, through the insertion slot 26, partially into the air draw-in passage 22 to partially close the air draw-in passage 22 and thus, the vacuum suction induced in the air draw-in passage 22 is small. When the electric field applied by the control circuit 46 to the piezoelectric ceramic piece 44 is at the minimum thereof, the piezoelectric ceramic piece 44, under the action of the electric field, deforms almost none and does not push the valve 42 to move forward so that the valve 42 is completely located outside the air draw-in passage 22, whereby the air draw-in passage 22 is completely open and the vacuum suction induced in the air draw-in passage 22 is maximum.

In the instant embodiment, the film-to-attach substrate 80 is a glass substrate and is held on a platform 100. The pressure bearing capacity of the film-to-attach substrate 80 can be determined according to the thickness of the film-to-attach substrate 80.

Step 3: Attaching the Film-to-be-Attached 60 to the Film-to-Attach Substrate 80 at a Corresponding Position.

Figure 7:
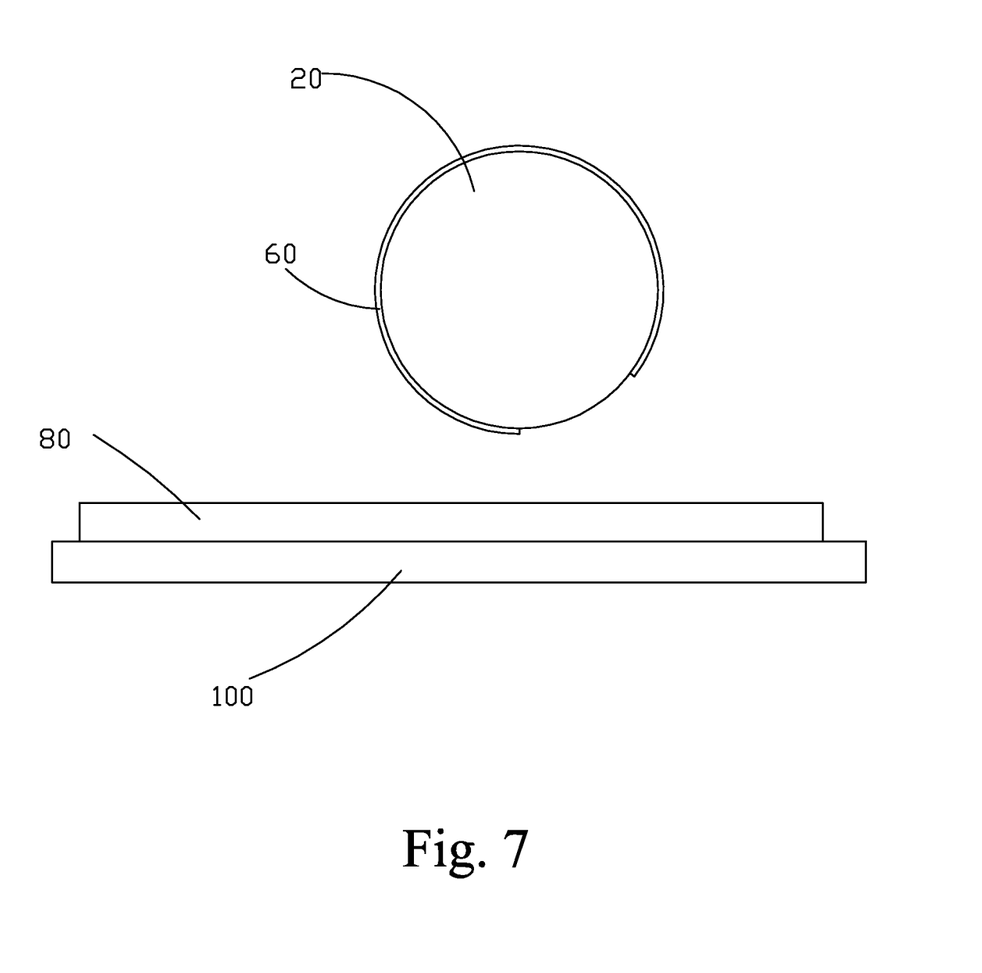
FIG. 7 is a schematic view illustrating a mechanism for carrying out film attachment according to the film attachment method of the present invention.
Figure 8:
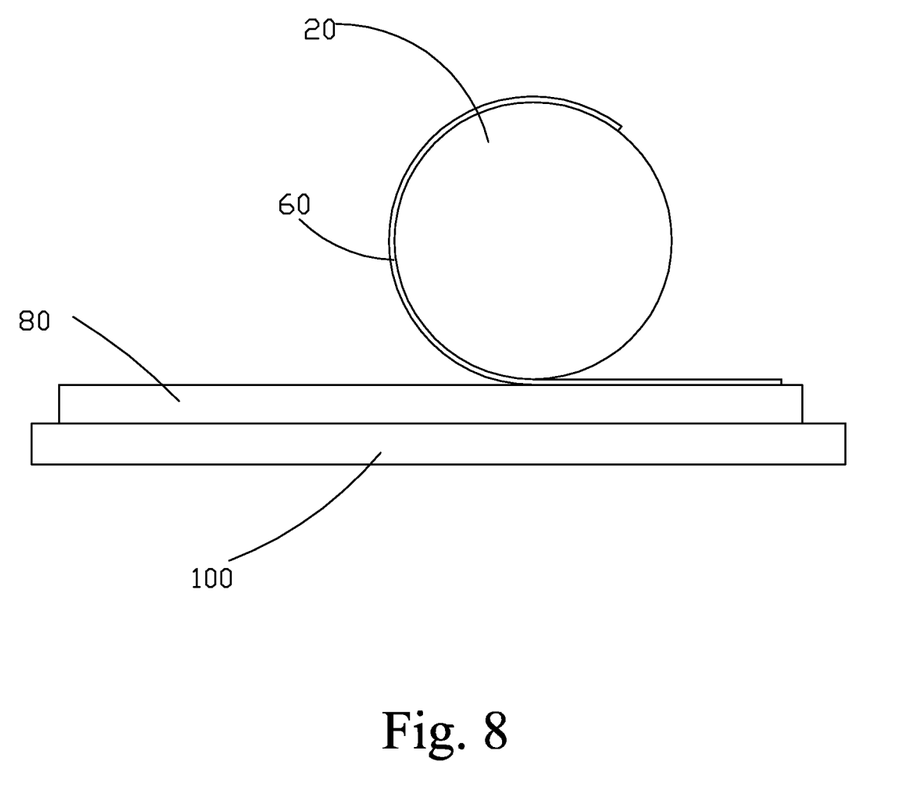
FIG. 8 is a schematic view illustrating an operation of film attachment carried out according to the film attachment method of the present invention.

Referring to FIGS. 7 and 8, the roller body 20 of the transfer roller is moved to approach the film-to-attach substrate 80 to such a condition where a starting end of the film-to-be-attached 60 engages the film-to-attach substrate 80 and is thus attached to the film-to-attach substrate 80. Then, the roller body 20 of the transfer roller is set into rotation to have the film-to-be-attached 60 that is held on the roller body 20 of the transfer roller to completely attach to the film-to-attach substrate 80.

It is noted that the piezoelectric ceramic piece 44 has additional characteristics including high frequency stability, high accuracy, and wide application ranges. This allows the present invention to use the control circuit 46 to accurately control the deformation of the piezoelectric ceramic piece 44 so as to achieve high preciseness control of the suction force of the roller body 20 applied to the film-to-be-attached 60.

Further, the piezoelectric ceramic piece 44 has a relatively small size, is not moisture-absorbable, and has an extended lifespan, making the adjustment devices 40 of the present invention small in size, easy in installation, less affected by moisture, and extended in lifespan.

In summary, the present invention provides a vacuum suction adjustable transfer roller and a film attachment method using the transfer roller, wherein piezoelectric ceramic based adjustment devices are provided in air draw-in passages of a roller body of a transfer roller has to accurately control the magnitudes of vacuum suction forces induced in the air draw-in passages so that when a film is attached, the suction force that the roller body applies to the film is adjusted according to the pressure bearing capacity of a substrate and the material of the film to prevent the substrate from breaking resulting from excessive pressure in attaching the film and thus effectively improving yield rate of attachment. The structure is simple and the operation is easy so that efficiency of attachment can be increased and the cost reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A vacuum suction adjustable transfer roller, comprising: a roller body and a plurality of adjustment devices mounted to the roller body, the roller body comprising a plurality of air draw-in passages uniformly distributed therein, the air draw-in passages drawing in air by means of an air evacuation device, each of the adjustment devices comprising: a valve arranged in each of the air draw-in passages, a piezoelectric ceramic piece connected to the valve, and a control circuit electrically connected to the piezoelectric ceramic piece, the control circuit controlling an intensity of an electric field applied to the piezoelectric ceramic piece so that the piezoelectric ceramic piece undergoes deformation under the action of the electric field and the valve is caused by the deformation of the piezoelectric ceramic piece to selectively insert into or withdraw out of the air draw-in passage so as to control flow of air drawn in by the air draw-in passage and thus controlling a magnitude of a vacuum suction force induced by the air draw-in passage; and wherein the roller body comprises an insertion slot corresponding to each of the air draw-in passages and the valve selectively insertable into and removable out of the air draw-in passage through the insertion slot to selectively close and open the air draw-in passage.

2. The vacuum suction adjustable transfer roller as claimed in claim 1, wherein the plurality of air draw-in passages is in communication with each other and the air evacuation device comprises a vacuum pump.

3. The vacuum suction adjustable transfer roller as claimed in claim 1, wherein the roller body comprises a mounting section corresponding to each of the air draw-in passages and the piezoelectric ceramic piece has two end mounted to the mounting section, the valve having an end fixedly mounted to a middle of the piezoelectric ceramic piece and an opposite end inserted into the air draw-in passage.

4. A vacuum suction adjustable transfer roller, comprising: a roller body and a plurality of adjustment devices mounted to the roller body, the roller body comprising a plurality of air draw-in passages uniformly distributed therein, the air draw-in passages drawing in air by means of an air evacuation device, each of the adjustment devices comprising: a valve arranged in each of the air draw-in passages, a piezoelectric ceramic piece connected to the valve, and a control circuit electrically connected to the piezoelectric ceramic piece, the control circuit controlling an intensity of an electric field applied to the piezoelectric ceramic piece so that the piezoelectric ceramic piece undergoes deformation under the action of the electric field and the valve is caused by the deformation of the piezoelectric ceramic piece to selectively insert into or withdraw out of the air draw-in passage so as to control flow of air drawn in by the air draw-in passage and thus controlling a magnitude of a vacuum suction force induced by the air draw-in passage;

wherein the roller body comprises an insertion slot corresponding to each of the air draw-in passages and the valve selectively insertable into and removable out of the air draw-in passage through the insertion slot to selectively close and open the air draw-in passage; and wherein the roller body comprises a mounting section corresponding to each of the air draw-in passages and the piezoelectric ceramic piece has two end mounted to the mounting section, the valve having an end fixedly mounted to a middle of the piezoelectric ceramic piece and an opposite end inserted into the air draw-in passage.

5. The vacuum suction adjustable transfer roller as claimed in claim 4, wherein the plurality of air draw-in passages is in communication with each other and the air evacuation device comprises a vacuum pump.

6. A film attachment method, comprising the following steps:
   (1) holding a film-to-be-attached on a transfer roller by means of vacuum;
   (2) adjusting vacuum suction that the transfer roller applies to the film-to-be-attached according to a pressure bearing capacity of the film-to-attach substrate and material of the film- to-be-attached; and
   (3) attaching the film-to-be-attached to the film-to-attach substrate at a corresponding position; and wherein the transfer roller comprises a roller body and a plurality of adjustment devices mounted to the roller body, the roller body comprising a plurality of air draw-in passages uniformly distributed therein, the air draw-in passages drawing in air by means of an air evacuation device, each of the adjustment devices comprising: a valve arranged in each of the air draw-in passages, a piezoelectric ceramic piece connected to the valve, and a control circuit electrically connected to the piezoelectric ceramic piece, the film-to-be-attached being held on the roller body of the transfer roller by means of vacuum, the roller body comprising an insertion slot corresponding to each of the air draw-in passages and the valve selectively insertable into and removable out of the air draw-in passage through the insertion slot to selectively close and open the air draw-in passage, the roller body comprising a mounting section corresponding to each of the air draw-in passages and the piezoelectric ceramic piece has two end mounted to the mounting section, the valve having an end fixedly mounted to a middle of the piezoelectric ceramic piece and an opposite end inserted into the air draw-in passage.

7. The film attachment method as claimed in claim 6, wherein in step (2), the control circuit controls an intensity of an electric field applied to the piezoelectric ceramic piece so that the piezoelectric ceramic piece undergoes deformation under the action of the electric field and the valve is caused by the deformation of the piezoelectric ceramic piece to selectively insert into or withdraw out of the air draw-in passage so as to control flow of air drawn in by the air draw-in passage and thus controlling a magnitude of a vacuum suction force induced by the air draw-in passage.

8. The film attachment method as claimed in claim 6, wherein the plurality of air draw-in passages is in communication with each other and the air evacuation device comprises a vacuum pump.

9. The film attachment method as claimed in claim 6, wherein the film-to-be-attached is a 3D film and the film-to-attach substrate is a glass substrate.

10. The film attachment method as claimed in claim 6, wherein the pressure bearing capacity of the film-to-attach substrate is determined according to thickness of the film-to-attach substrate.

* * * * *